US006996718B1

(12) United States Patent
Henry et al.

(10) Patent No.: US 6,996,718 B1
(45) Date of Patent: Feb. 7, 2006

(54) SYSTEM AND METHOD FOR PROVIDING ACCESS TO MULTIPLE USER ACCOUNTS VIA A COMMON PASSWORD

(75) Inventors: Paul S. Henry, Holmdel, NJ (US); Hui Luo, Old Bridge, NJ (US)

(73) Assignee: AT&T Corp., New York, NY (US)

( * ) Notice: Subject to any disclaimer, the term of this patent is extended or adjusted under 35 U.S.C. 154(b) by 882 days.

(21) Appl. No.: 09/637,409

(22) Filed: Aug. 11, 2000

Related U.S. Application Data (60) Provisional application No. 60/199,090, filed on Apr. 21, 2000.

(51) Int. Cl.
- H04K 1/00 (2006.01)
- H04L 9/00 (2006.01)
- H04L 9/332 (2006.01)
- G06F 11/30 (2006.01)
- G06F 12/14 (2006.01)

(52) U.S. Cl. .................. 713/182; 713/183; 713/184; 713/185; 713/186; 713/202

(58) Field of Classification Search ........... 713/202, 713/155, 170, 182–186, 171, 156, 158, 187; 380/30, 277, 270, 29, 25, 49, 43, 44

See application file for complete search history.

(56) References Cited

U.S. PATENT DOCUMENTS

| | | | | |
|---|---|---|---|---|
| 5,638,448 A | * | 6/1997 | Nguyen | 380/29 |
| 5,664,017 A | * | 9/1997 | Gressel et al. | 380/30 |
| 5,689,566 A | * | 11/1997 | Nguyen | 713/155 |
| 5,774,552 A | * | 6/1998 | Grimmer | 713/156 |
| 5,892,828 A | * | 4/1999 | Perlman | 713/183 |
| 6,606,387 B1 | * | 8/2003 | Abraham | 380/277 |
| 6,615,353 B1 | * | 9/2003 | Hashiguchi | 713/185 |
| 6,662,300 B1 | * | 12/2003 | Peters | 713/182 |
| 2002/0138728 A1 | * | 9/2002 | Parfenov et al. | 713/170 |
| 2003/0012382 A1 | * | 1/2003 | Ferchichi et al. | 380/270 |
| 2003/0097564 A1 | * | 5/2003 | Tewari et al. | 713/171 |
| 2003/0105956 A1 | * | 6/2003 | Ishiguro et al. | 713/158 |

* cited by examiner

Primary Examiner—Christopher Revak
Assistant Examiner—Arezoo Sherkat (57) ABSTRACT

A common password method is disclosed which provides both convenience and security assurance for users who have multiple accounts protected by passwords. According to the present invention, a user only needs to remember a common password to access any of the user's accounts. A designated password for each account is generated by a hash function of the common password and some account-dependent information. The hash value is calculated at the user's computer, and then submitted as a designated password to a server. Thus, each account is protected by the distinct designated password, and the common password is never revealed in an unauthorized manner.

1 Claim, 7 Drawing Sheets

SYSTEM AND METHOD FOR PROVIDING ACCESS TO MULTIPLE USER ACCOUNTS VIA A COMMON PASSWORD

This applications claims the benefit of U.S. Provisional Patent Application Ser. No. 60/199,090 filed Apr. 21, 2000, the entire contents of which are incorporated herein by reference as if fully reproduced herein.

BACKGROUND OF THE INVENTION

This invention relates to the World Wide Web and more specifically, to a method for providing access to multiple Web-based accounts via a secure common password.

The amount of Internet related services available, such as product and information providers and retailers is ever-expanding. Typically, many of these product/service providers and/or information purveyors will require a user to create and maintain an account to gain access to the products, services or information which is being offered over the Internet. These accounts are usually accessed by the user providing a user identification (ID) and a password to gain access to the account. For example, a user may have multiple user IDs and password for their accounts ranging from one or more electronic commerce sites, primarily content based sites, electronic mail accounts, stock trading and/or research accounts, etc. Consequently, a user is faced with having to remember many different passwords which provide access to each of these different accounts. Theoretically, a user may select and use the same password for all of their different account to facilitate the login process for these multiple accounts However, such a course of action would not be considered prudent since an unauthorized disclosure of the password would compromise the security and integrity of all of the user's accounts.

Currently, a Web-based method to ease and facilitate a user's login procedure is to save user IDs and passwords as cookies at a user's computers. With cookies, the user doesn't have to remember all of their respective user IDs and passwords since they are saved in the cookies. However, cookies are deficient in that the information stored in the cookies is not readily portable. For example, a user will not be able to access his/her account from another computer other than the user's typical computer, whether it may be a home or a work computer, since the cookies are stored only locally on the user's home and/or work computer. In addition, cookies and cookie-like facilities may be vulnerable to some security breaches if these cookies are not properly managed, such as if the user's computer is shared by other third parties. Furthermore, cookies and cookie-like facilities do not guarantee the independence between different passwords since the user may still choose the same user ID and password for many accounts which is undesirable as discussed earlier herein.

Other prior art attempts to provide improved password protection services involve proxy-based services that can automatically generate random passwords for different accounts for users who browse Web via proxies provided by the account service providers. Typically, these services require a user to use a password to authenticate himself to the proxy. When a user re-visits an account protected by a proxy-generated password, the proxy will find the corresponding password from its storage and supplies it to the account automatically. While this proxy method may address some of the portability problem experienced by, for example, cookies and cookie-like facilities, and may guarantee the independence between different passwords, the proxy method has some significant security problems. For example, these prior art methods, proxy based password services do not allow an end-to-end secure connection, such as Secure Socket Layer/Transport Layer Security (SSL/TLS), between the user's computer and the server, which is however desired at the moment when the user is prompted to enter a password. In addition, in the prior art, the proxy is a central repository for all the confidential and sensitive information, i.e., the various user IDs and passwords, for all accounts of all users using this proxy. Thus if the proxy is compromised or "hacked", the sensitive user information may be accessed by unwanted and unauthorized parties.

Accordingly, a common password method which provides both convenience and security assurance without the deficiencies and drawbacks of the prior art is desirable.

SUMMARY OF THE INVENTION

The present invention is a common password system and method which provides both convenience and security assurance for users who have multiple accounts protected by passwords. In the present invention, a user only needs to remember a single common password to access all of the user's accounts. In a preferred embodiment, a designated password for each of the user's accounts is generated by a hash transform of the common password. Therefore, if one account is compromised for any reason, the other accounts will still be secure. In one embodiment of the present invention, the user can update the designated passwords for all of the user's accounts without having to change the common password.

A World Wide Web based implementation of the common password system and method is also disclosed. In this embodiment, the information used to compute the password hash transform is dynamically delivered from a password transform server, which knows neither the common password nor any designated passwords but can prevent a malicious server from stealing the common password from a user. In one embodiment of the present invention, the method for providing access to multiple Web accounts via a universal password which is valid for the multiple Web accounts includes providing a designated password for each of the multiple Web accounts, receiving the universal password for access to at least one of the multiple Web accounts, determining if the universal password is valid based on the associated designated password for the at least one of the multiple Web accounts and providing access to the at least one of the multiple Web accounts provided the universal password is valid.

DETAILED DESCRIPTION OF PREFERRED EMBODIMENTS

Figure 1:
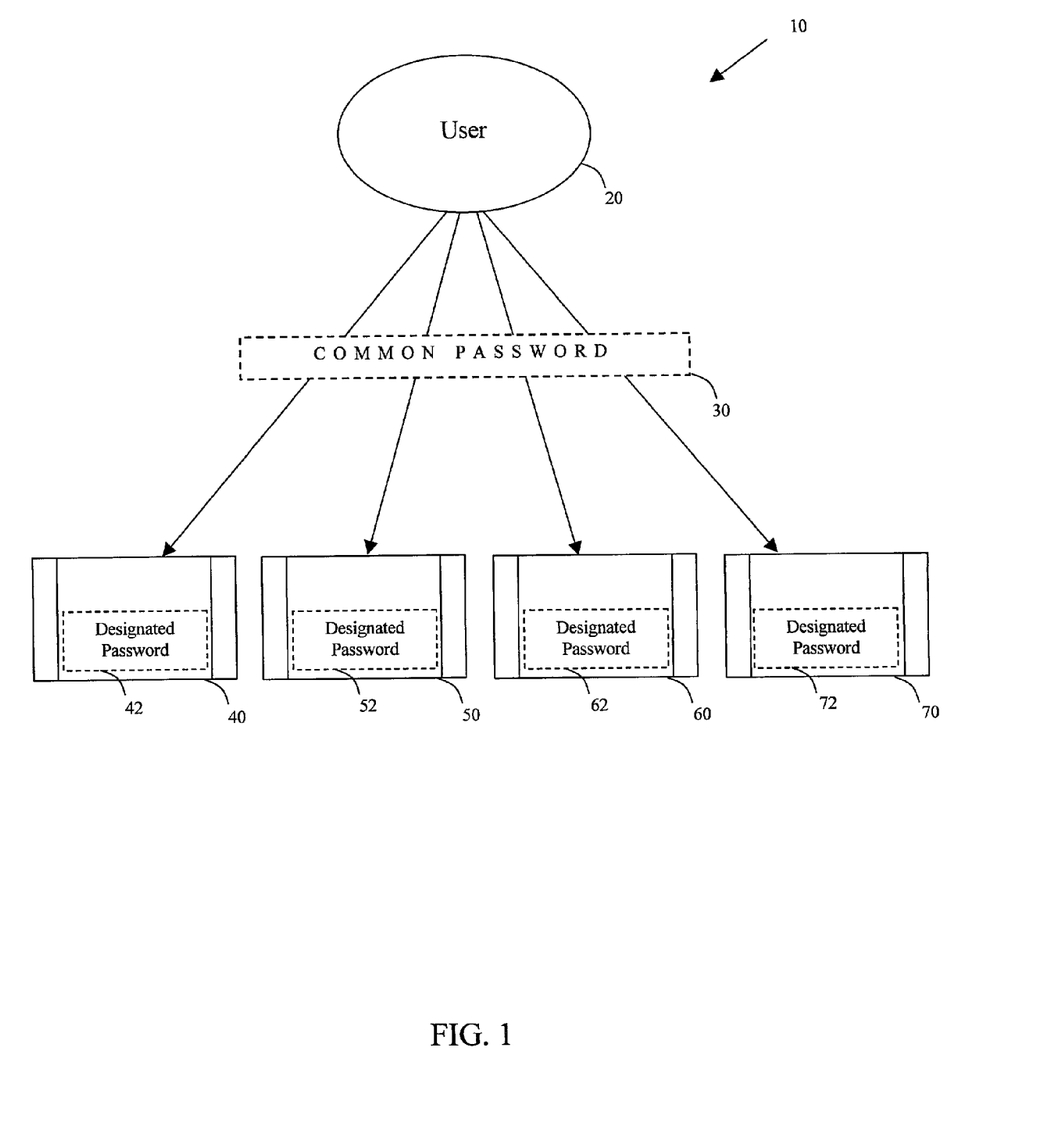
FIG. 1 shows a system overview of a common password system in accordance with the teachings of the present invention.

Referring to FIG. 1, a system 10 for providing one or more users with access to multiple accounts via a common password is shown. The system 10 includes at least one user 20 having a common password 30 which provides the user with access to multiple accounts 40, 50, 60 and 70 via the common password 30. Each of the multiple accounts 40, 50, 60 and 70 includes a corresponding or associated designated password 42, 52, 62 and 72 which is associated with each of the multiple accounts 40, 50, 60 and 70. As used herein, the term "password" refers to some indicia, such as a combination of letters, numbers or both which is used typically to provide entry and access to an account, such as a Web site account, electronic mail account or other similar account. The term "common password" refers to a single password which is valid for access among multiple different account but provides both convenience and security assurance for users who have the multiple accounts. In the present invention, a user only needs to remember the common password to gain access to all of the user's accounts.

In the present invention, the common password method is configured to comply with the following requirements: (1) A user needs to remember only one password, the common password, to access any of the user's accounts; (2) Each account is protected by a distinct password, called a designated password, which is transformed from the common password, as discussed in more detail later herein; (3) It should be extremely difficult to derive the common password from a designated password; (4) It should be extremely difficult to derive one designated password from another designated password; and (5) A designated password can be updated without changing the common password. Requirement 1 provides general convenience and portability to a user with multiple account and while also providing additional security for the user. Since a user only needs to remember one password, the user may choose a long password, e.g., a sentence, as the user's common password since such a long password would be resistant to a dictionary attack based on a revealed designated password. In addition, the common password doesn't need to be saved anywhere, because the user can easily remember it.

Requirements 2, 3, and 4 together provide additional security assurance for the common password method. Assume one designated password is compromised for some reason. Under such circumstance, if Requirements 2, 3, and 4 are satisfied, the security breach can be limited within the account associated with the compromised designated password. The knowledge of the compromised designated password cannot be used to break or compromise any of the other accounts. In addition, the common password doesn't need to be changed even if one or more of the designated passwords are compromised. Requirement 5 provides further security assurance for designated passwords, which allows the designated passwords to be updated frequently without degrading the user's convenience. To maximize the security performance, a user can elect to update designated passwords every time the user accesses his/her accounts.

In the present invention, to generate, process and validate the common password and associated designated passwords for each of a user's accounts, a password transform algorithm is utilized. In a preferred embodiment of the present invention, the password transform algorithm may be generalized as follows:

$$Pd=\text{Text}(\text{Hash}(Ui+Pc+Si+Nr))$$

Where, Pd stands for a designated password, Ui for a user ID (such as a login ID selected by the user or provided by an account service provider), Pc for a common password (which is preferably selected by a user as discussed above), Si for a server name (such as the server name or URL of the user's account service provider), and Nr for a random number. The "Text( )" portion represents the text conversion and the "Hash( )" portion represents the hash function.

The password transform algorithm is process in two major steps. The first step is to calculate a hash function ("Hash ( )") by taking the common password and some account-dependent information. Any hash functions as known in the art, such as SHA [SHA] and MD5 [MD5], could serve this purpose. The account-dependent information includes a user ID, a server name that indicates the account location, and a random number that is associated with the account and stored at the server. The should be readily available and need not be specifically remembered by the user. The user id and the server name cooperate to uniquely define a unique account belonging to the user.

The second step is to convert the output of a hash function, which is usually in binary form, into text form for use as a designated password. If an account allows Roman letters appear in the password, the Base64 [BASE64] algorithm is used, without ending '=' or '=' in case the total number of bits of a hash value is not a multiple of 24. If the account only accepts digits, such as a Personal Identification Number (PIN), every 3 bits is converted into a digit. In case the total number of bits of a hash value is not a multiple of 3, 1 bit '0' or 2 bits '00' are appended to the hash value before the conversion.

In another embodiment of the present invention, the password transform algorithm can be described as follows:

$$Pd=\text{Text}(\text{Hash}(Ui+\text{"|"}+Pc+\text{"@"}+Si+\text{"+"}+Nr))$$

Where, Pd stands for a designated password, Ui for a user id, Pc for a common password, Si for a server name, and Nr for a random number supplied by the server. Text( ) represents the text conversion and Hash( ) the hash function. The operator "+" denotes a concatenation operation and "|" and "1" are introduced for memory purpose and may serve as separators.

In the present invention, the security assurance of the password transform algorithm is endorsed by the characteristics of hash function. Specifically, Requirement 2 as discussed above is satisfied because it is computationally impossible to find two texts that have the same hash value. Requirements 3 and 4 as also discussed above are satisfied because a hash function cannot be reversed and therefore deriving a common password from a designated password or a designated password from another designated password would be extremely difficult if not impossible.

Figure 2:
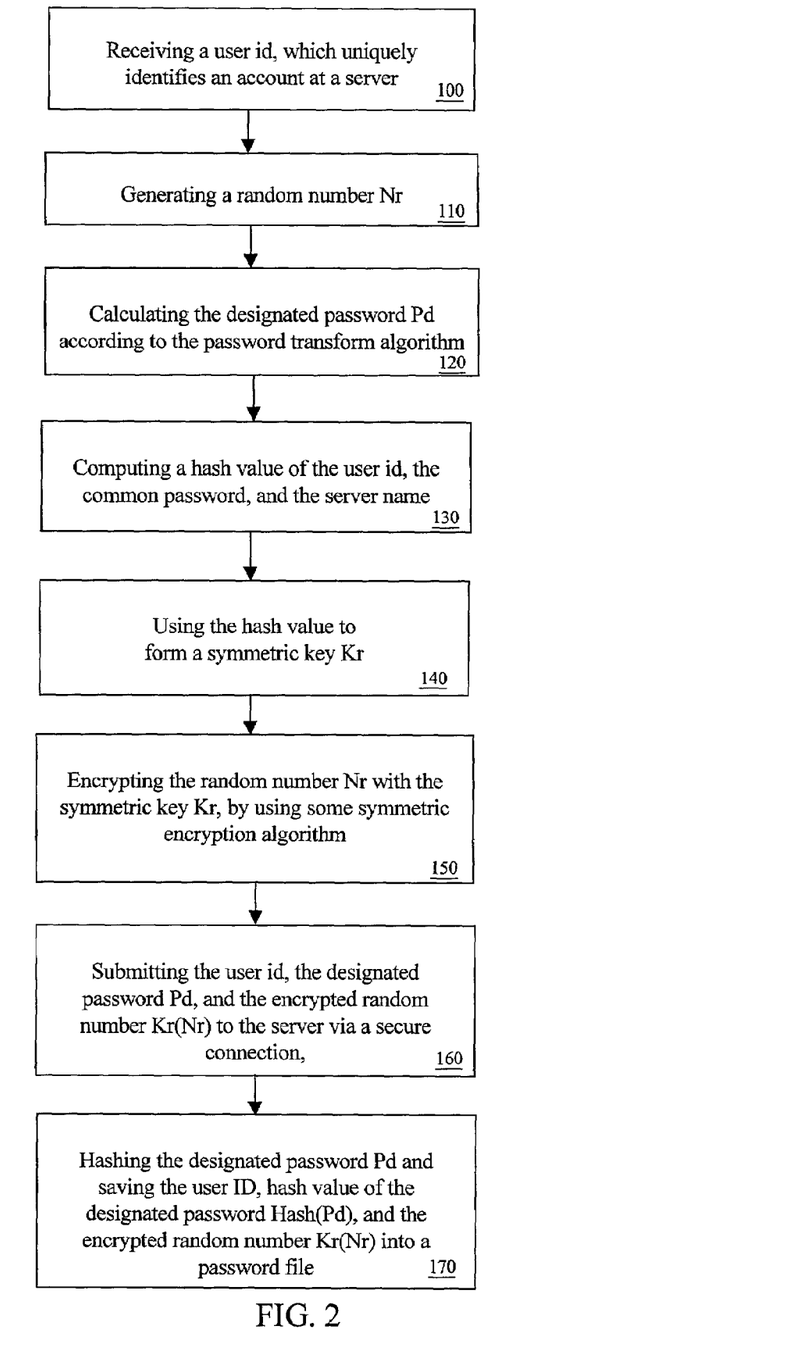
FIG. 2 shows an exemplary process for generating a password for an account.

A discussion of the mechanics and process for opening a user account, accessing the user account and changing the designated password for the account now follows. Referring to FIG. 2, a method for establishing an account utilizing a common password is shown. It is assumed at this stage that the user has already chosen a common password to use for their multiple accounts. As discussed herein, the common password should be a word, phrase, combination of letters and/or numbers which is easily remembered by the user. When a user opens an account at a server or account service provider, the user will need to choose a user ID, which can uniquely determine an account at a server. The user ID will be received by the server or account service provider, step 100. A random number Nr is generated, typically by the server, step 110, which will be used as discussed earlier herein with respect to the password transform calculation. The designated password Pd is calculated according to the password transform algorithm, step 120. A hash value of the user id, the common password, and the server name is computed, step 130. The hash value is used to form a symmetric key Kr, step 140. The random number Nr is encrypted with the symmetric key Kr, step 150. In one embodiment, a symmetric encryption algorithm is used, such as DES [DES, 3DES] or Blow Fish [SCHNEIER]. The user's user ID, the computed designated password Pd, and the encrypted random number Kr(Nr) are submitted to the server via a secure connection, step 160. The server then hashes the designated password Pd [EVAN] and saves the user ID, the hash value of the designated password Hash (Pd), and the encrypted random number Kr(Nr) into a password file, step 170. In the present invention, the above method will be performed for each of a user's multiple accounts so that a designated password and associated user ID and encrypted random number will be saved for each of the user's multiple accounts. The designated password may later be changed without changing the user's common password as discussed in more detail later herein.

Figure 3:
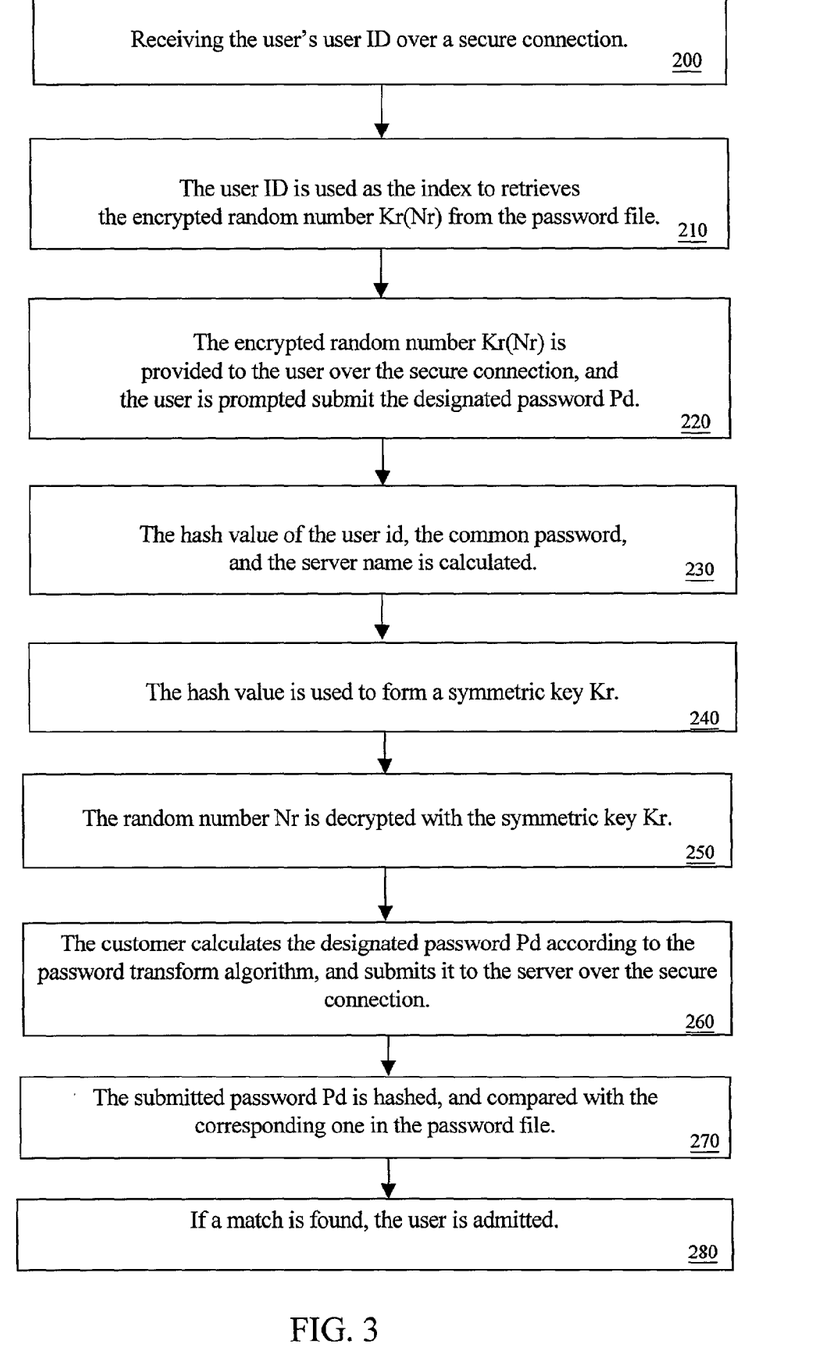
FIG. 3 shows an exemplary process for authenticating a password with an account

Once a user's account has been established as discussed above, the user will be able to access his/her account at the server. The access/authentication process is discussed with reference to FIG. 3. In the present invention, the user's user ID is received, preferably provided by a user to the server over a secure connection, step 200. The user ID is used as the index to retrieves the encrypted random number Kr(Nr) from a password file, step 210. The encrypted random number Kr(Nr) is provided, preferably by the server to the user over the secure connection, and the server prompts the user to submit the designated password Pd, step 220. The hash value of the user id, the common password, and the server name is calculated, preferably by the user, step 230. The hash value is used to form a symmetric key Kr, preferably by the user, step 240. The random number Nr is decrypted with the symmetric key Kr, preferably by the user, step 250. The designated password Pd is calculated according to the password transform algorithm, and submitted to the server over the secure connection by the user, step 260. The submitted password Pd is hashed, and compared with the corresponding one in the password file by the server, step 270. If a match is found, the user is admitted to the account, step 280.

Figure 4:
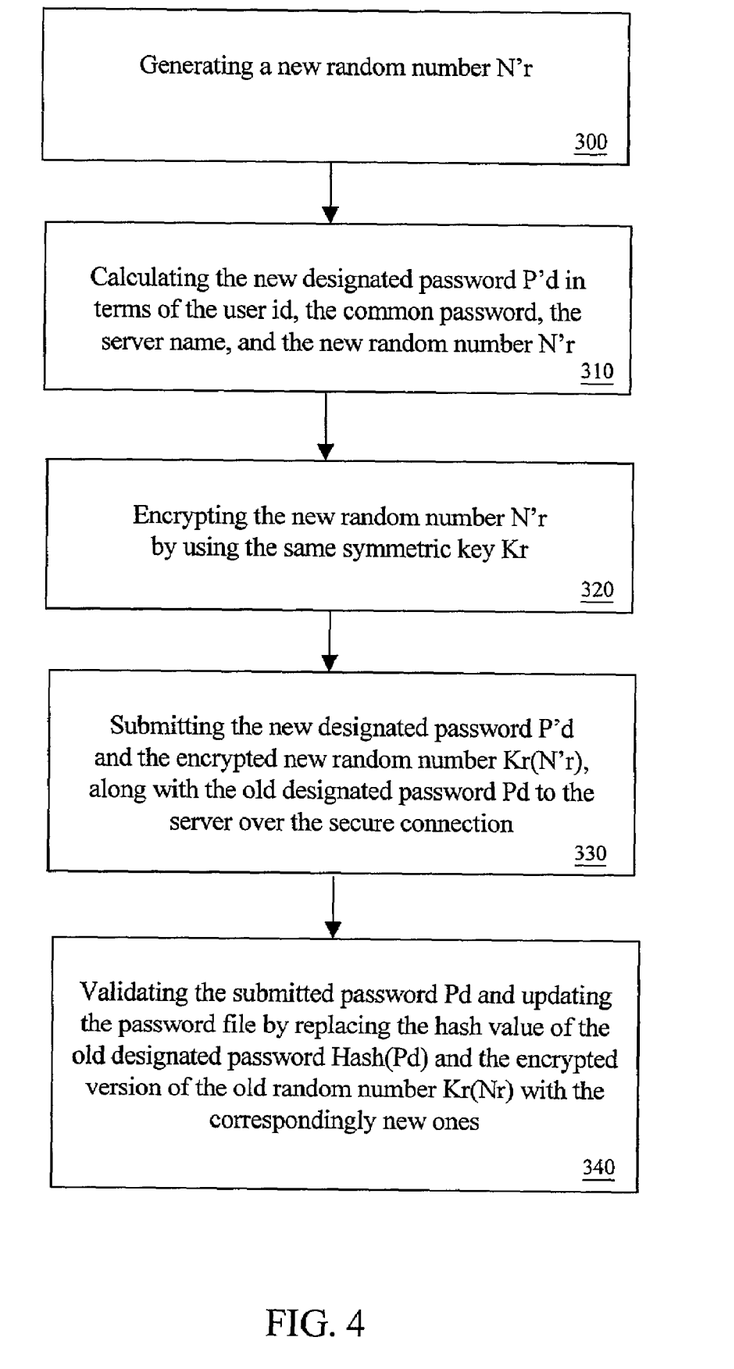
FIG. 4 shows an exemplary process for updating a password for an account.

With reference to FIG. 4, an exemplary method for updating a designated password for any one or more of a user's existing multiple accounts for which a designated password has been previously established is shown. In this process, the user does not have to change the user's common password. It is contemplated that at times, a user may want to change the designated password for any one or more of the user's accounts for any number of reasons, such as if the designated password for a particular account has been compromised. Referring again to FIG. 4, a new random number N'r is generated, step 300. The new designated password P'd is calculated in terms of the user's user ID, the common password, the server name, and the new random number N'r, step 310. The new random number N'r is encrypted by using the same symmetric key Kr, step 320. The new designated password P'd and the encrypted new random number Kr(N'r), along with the old designated password Pd is submitted to the server over the secure connection, step 330. The submitted password Pd is validated and the password file is updated by replacing the hash value of the old designated password Hash(Pd) and the encrypted version of the old random number Kr(Nr) with the correspondingly new ones, step 340.

From the above, it can be seen that the password transform algorithm should be performed at the user's computing device, such as the user's personal computer. In the present invention, the password transform algorithm can be implemented in any portable manner as long as the computing device is secure. For example, it can be implanted in a PDA, wireless telephone or other similar device. Preferably, the common password system may be implemented on the user's device without pre-installing any specialized computing utility or software on the user's computer. The main task of the Web-based implementation is to supply the password transform algorithm to a user over the Internet and guarantee that the transform is performed at the user's computer, such that the common password is never revealed to any server.

Following is a discussion of a Web-based implementation of the common password system and method of the present invention. In such an implementation, it is assumed that the user's computer is trustworthy, the user's Web browser or Web access facility supports JavaScript or similar computing language and the connections from the user's computer to any other computers are over a secure protocol such as a Secure Socket Layer (SSL) protocol.

Figure 5:
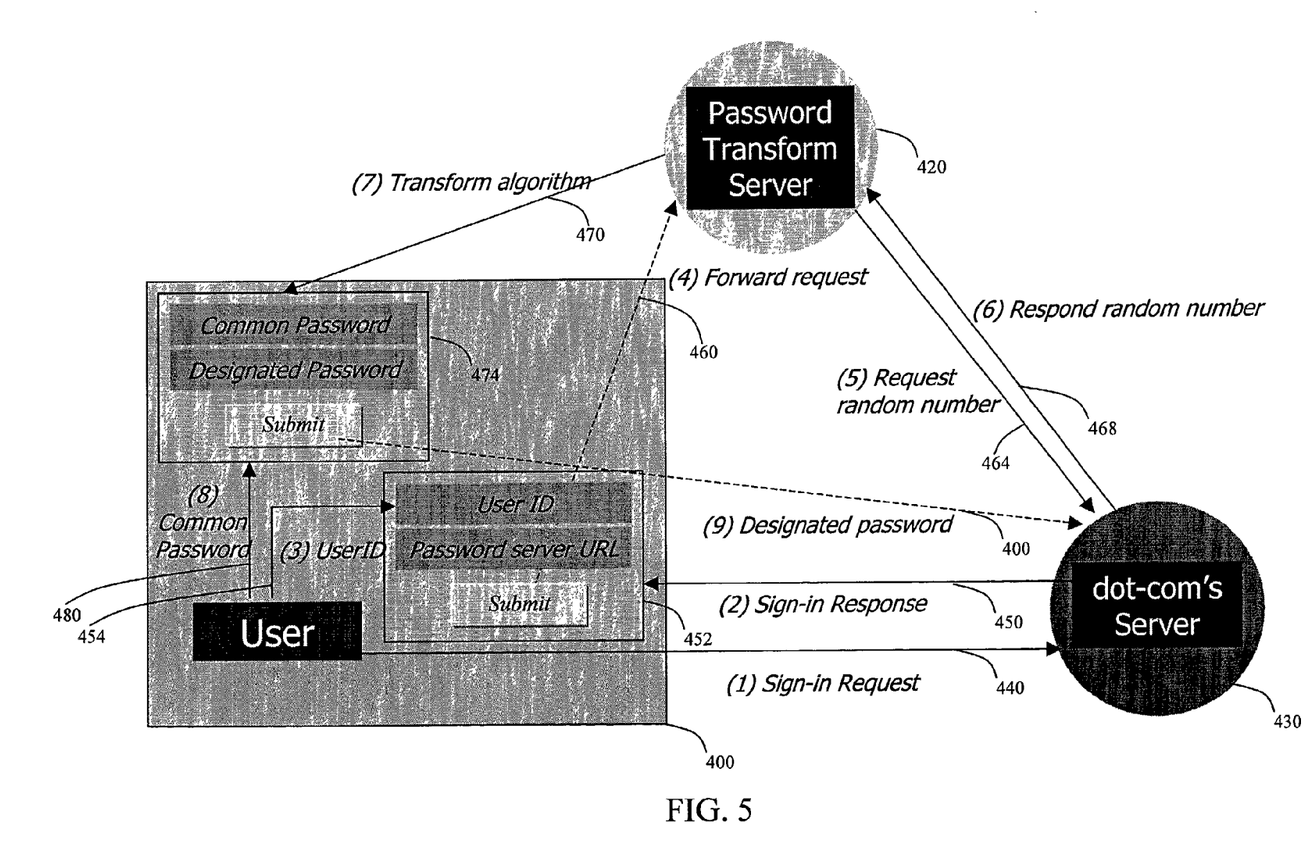
FIG. 5 shows an exemplary common password system.

Referring to FIG. 5, a Web-based implementation of the common password system and method includes a user's computer 400 as a Web client, a password transform Web server 420, and a Web server 430 that hosts one of accounts for the user. The Web server 430 may be any type of server such an e-commerce type server, a content/information based server or other similar type of server which provides accounts for access by one or more users. In this Web-based implementation of the common password system and method, the password transform server 420 ensure the integrity of the common password system. Initially, it may appear that simply a Web client and a Web server, would be sufficient to support a common password system. For example, when a user requests to access his/her account at a server, the server first delivers an "enter user ID" Web page to the user. After the user enters the user ID and submits it to the server, the server then delivers an "enter common password" Web page to the user, in which the encrypted random number and some JavaScript code are included. After the user enters the common password and clicks the "submit" button, the JavaScript code computes the designated password from the user id, the common password, the server name, and the random number. The common password is then immediately erased, and only the designated password is sent to the server. However, the problem with solely a Web client and Web server implementation is that these two components alone cannot prevent a malicious server from stealing the common password by delivering a fake "enter common password" Web page to a user who doesn't know the technical details of HTML and JavaScript. For example, the fake "enter common password" Web page could have the same appearance as does a valid such page. However, the fake page will send the common password back to the malicious server. After stealing the common password, the malicious server can theoretically infiltrate any of the user's accounts at other servers.

The password transform server 420 as described and shown herein provides a solution to the deficiencies of having only a Web client and Web server implementation. In the present invention, the password transform server 420 and not the Web server 430, that supplies the "enter common password" page to a user, and it is the user who selects a trusted password transform server in the "enter user id"

page. The default password transform server could be a well-known Web server by the public, which is designated to supply the "common password transform" Web page to any user over the Internet. The source code of this page may be open to the public, in which the password transform algorithm shall be written in a language such as JavaScript or other similar language, such that the code's behavior may be verified. Besides using the well-known password transform server, the user could run his own password transform server program at a trusted computer that is accessible on the Internet. In a preferred embodiment of the present invention, the password transform server must have a valid security certificate [X509, PKIX] and deliver the "enter common password" Web page over an SSL connection, such that a user will be confident that the received "enter common password" page is genuine. If the password transform Web page is supplied over an insecure connection or if the Web server doesn't have a security certificate, a hacker could possibly replace the password transform Web page by a fake one with the same appearance, which then may fools the user who will then send the common password back to the hacker.

Figure 6:
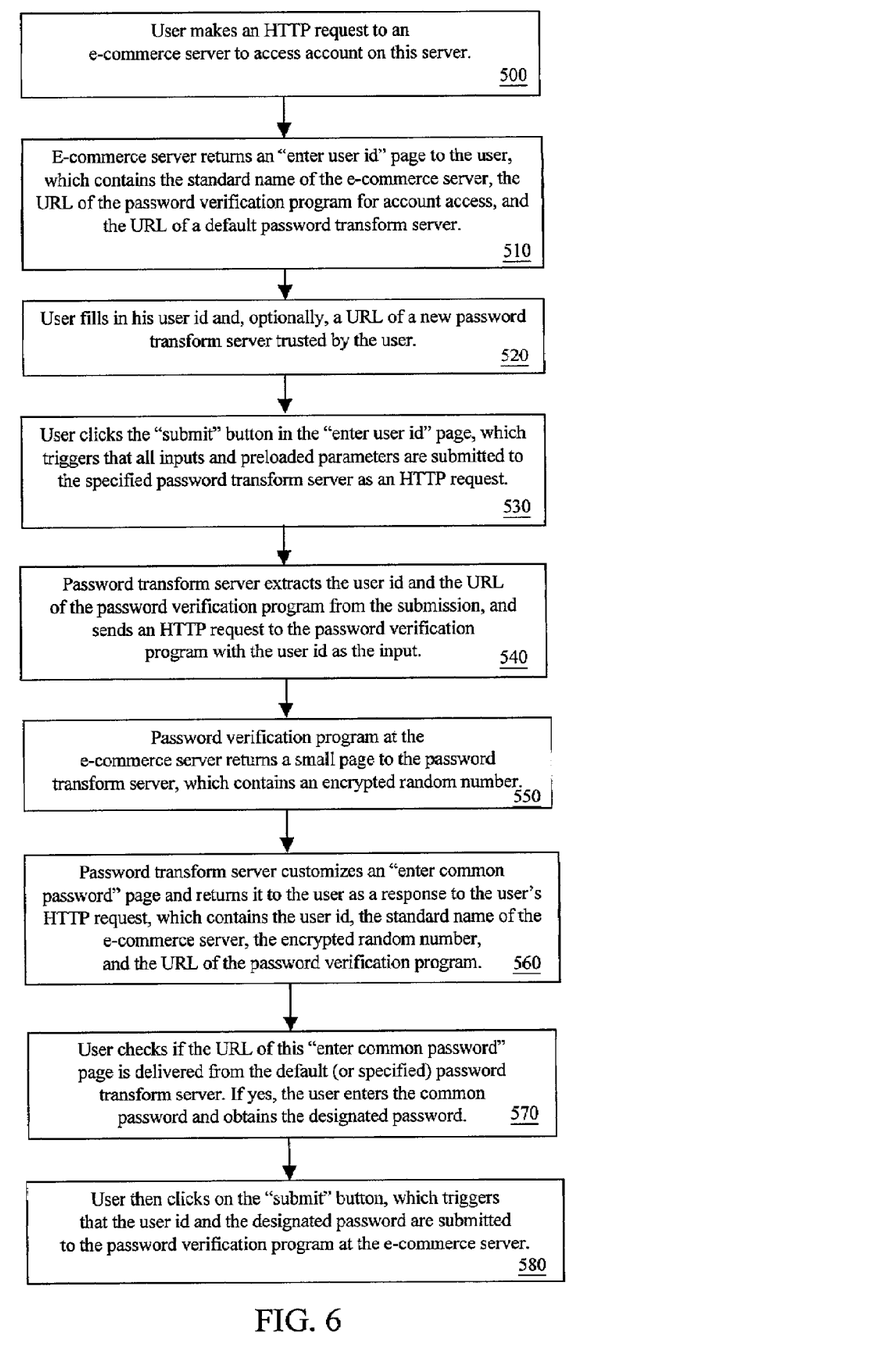
FIG. 6 shows an exemplary process for providing a Web based common password.
Figure 7:
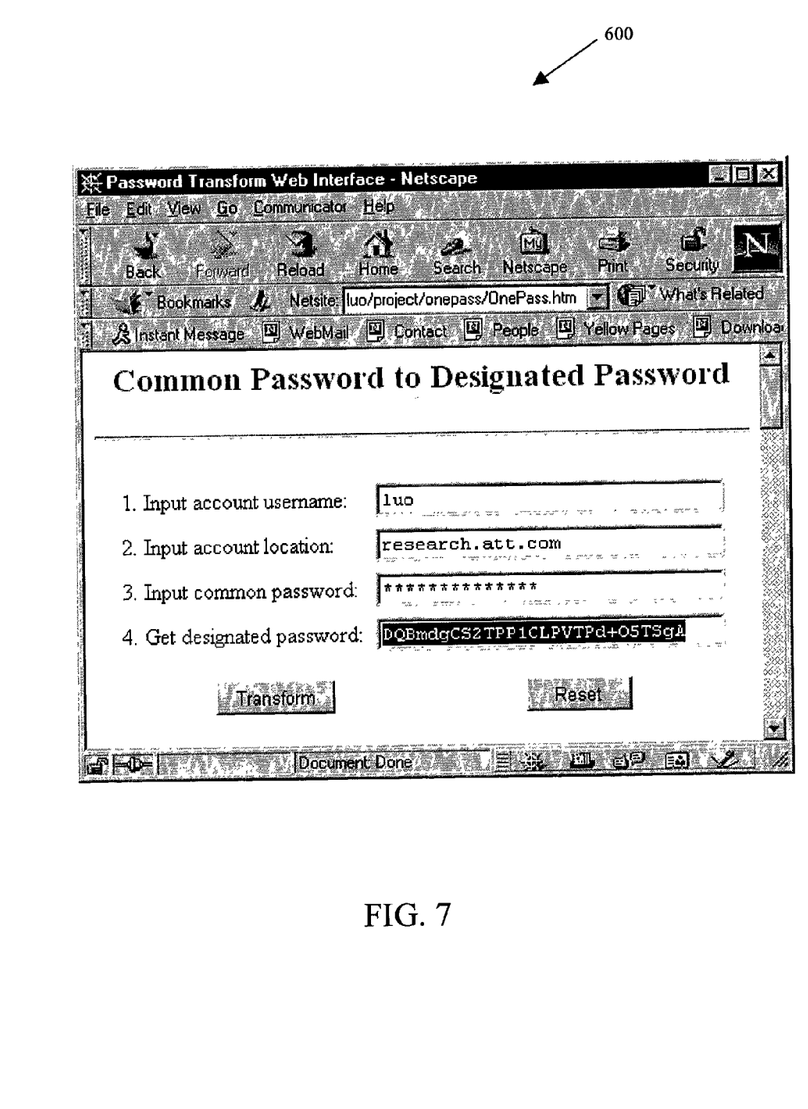
FIG. 7 shows an exemplary user screen for a password transform calculator.

In one embodiment of the present invention, the HTML file of the "enter common password" Web page is generated by the password transform server on an as-needed basis. If a user makes a direct request for this page, the password transform server will return a stand-alone password transform calculator 600 to the user, as shown in FIG. 6. Preferably, three distinct parameters, a user ID, a server name, and a common password are needed to generate a designated password for a given account. Using this on-line calculator 600, a user can compute passwords for any kind of computer accounts, including non-Web accounts. To do so, the user has to remember and provide the URL of the password transform server to the calculator 600.

Referring back to FIG. 5, the password transform server 420 operates as a broker between the user 400 and the Web server 430 during the authentication process. When a user requests to access his account at an e-commerce server via a sign-in request 440, the e-commerce server returns a sign-in response 450 to the user, typically in the form of an "enter user id" page 452. Some parameters regarding how to go back to the e-commerce server may be included in this page. After the user enters a user id 454 and optionally a URL of some trusted password transform server, and clicks the "submit" button on page 452, the user id and those parameters are sent to the default or specified password transform server as a forward request 460. Upon receiving this request, the password transform server immediately contacts the e-commerce server in a request for a random number 464 and obtains the encrypted random number associated with the user id via a random number response 468. Then, the password transform server processes these parameters via the transform algorithm 470 to customize an "enter common password" page 474 and return it to the user. This customized page contains some special information such as the URL of a CGI program that is responsible for password verification at the e-commerce server. It also contains the user id, the encrypted random number, and the e-commerce server name. The customized page also needs to display a message and remind the user of checking the URL window of his Web browser to see if this "enter common password" page is truly delivered by the right password authentication server. For example, a malicious e-commerce server could send a special "enter user id" page to a customer, which will return the user id and the URL of a trusted password transform server entered by the customer to the malicious server. The malicious server could then send a fake "enter common password" page to the customer, which has the same look as the genuine one supplied by the password transform server. However, a non-technical customer can easily identify if the current "enter common password" page is a fake one by checking the URL window of his Web browser. It is genuine if and only if the URL displayed in the URL window matches that of the default (or specified) password transform server. After the user provides the common password 480, the designated password is calculated at the user's computer and then submitted to the password verification program at the e-commerce server. The common password is erased from the memory before the designated password is submitted.

In the present invention, the parameters contained in the "enter user ID" page, which are supplied by the e-commerce server and the user, and will be submitted to the password transform server are as follows: a URL of the designated password verification program at the e-commerce server (required); a user ID (required); a standard name of the e-commerce server (required); a common password method version number supported by the e-commerce server (optional); a security certificate of the e-commerce server (optional); and a session ID issued by the e-commerce server (optional).

The parameters contained in the customized "enter common password" page which are supplied by the password transform server and the user, and will be submitted to the e-commerce server are as follows: a user ID (required); an encrypted random number (optional); a standard name of the e-commerce server (required); a designated password (required); a new designated password in case the user changed the common or designated password (optional); a new encrypted random number in case the user changed the common or designated password (optional); a common password method version number supported by the password transform server (optional); a session ID issued by the e-commerce or account service provider server (conditionally required); and a security certificate of the password transform server (optional). In one embodiment of the present invention, the HTTP request method for transmitting these parameters can be either "POST" or "GET" method (HTTP/1.0, HTTP/1.1 or other related or updated versions).

Some exemplary code to explain the detailed process of the Web-based implementation for the common password method is now shown and discussed. For the purpose of simplicity, it is assumed that a default well-known password transform server is used and a user does not need to choose or provide the name or location of a password transform server.

For purposes of this exemplary embodiment, it is assumed that "https://www.worldnet.att.net/OnePassword" is the URL of the "enter common password" page supplied by the default password transform server, "https://www.e-retailer-.com" is the standard name of the e-commerce or account service provider server, which serves as an identity for the server, and "https://www.e-retailer.com/login" is the URL of the designated password verification program to which the designated password shall be submitted. To make things work, the e-retailer or Web page provider needs to put the following exemplary code in its "enter user id" page,

```
<FORM ACTION="https://www.worldnet.att.net/OnePassword" METHOD="post">
<INPUT TYPE="hidden" NAME="ServerName" VALUE="www.e-retailer.com">
<INPUT TYPE="hidden" NAME="LoginURL" VALUE="https://www.e-retailer.com/login">
<TABLE>
<TR><TD>Enter user id: </TD>
<TD><INPUT TYPE="text" NAME="UserID" VALUE="" SIZE="10"></TD></TR>
<TR><TD COLSPAN=2 ALIGN="center">
<INPUT TYPE="button" NAME="SubmitButton" VALUE="Submit">
</TD></TR>
</TABLE>
</FORM>
```

After the user enters a user ID and clicks on the "submit" button, an HTTP request is sent to the password transform server, along with the hidden parameters that tell the password transform server how to customize a "enter common password" page for the user. It should be noted that a key component used to generate the common password, an encrypted random number, is missing in the "enter user-ID" page. This is because the e-commerce or account service provider server doesn't know which encrypted random number shall be contained in the "enter user ID" page before the user submits a user ID. However, this may be resolved by the password transform server, because the user ID now has been submitted to the password transform server by the user. One exemplary Web-based solution to this problem could be constructed as follows. The password transform server sends an HTTP request to the designated password verification program at the e-commerce or account service provider server, with the submitted user ID as the query parameter. The e-commerce server then responds by providing a small page to the password transform server, with the encrypted random number embedded.

After the encrypted random number is successfully retrieved from the e-commerce or account service provider server, the password transform server will customize an "enter common password" page and return it to the user as a response to the submission of the user id. The user id, the name of the e-commerce or account service provider server, the encrypted random number, and the URL of the designated password verification program at the e-commerce or account service provider server are contained in this customized page. Assuming the user ID is "luo" and the encrypted random number is "0123456789", the exemplary code for the customized "enter common password" page is given below (For the purpose of simplicity, the password updating option is omitted in the code).

```
<HTML>
<HEAD>
<TITLE>Common Password Transform for www.e-retailer.com</TITLE>
<SCRIPT LANGUAGE="JavaScript">
function hash(s)
{
...// calculate the hash value of the string s
}
function base64(s)
{
...// convert the binary string s into a text string s
}
function makekey(userid, password, servername)
{
...// make a symmetric key based on user id, common password, and server name
}
function des(s, key)
{
...// encrypt/decrypt the string s using the key
}
function convert(userid, password, servername, randnum)
{
return (base64(hash(userid+"|"+password+"@"+servername+"+"+randnum)));
}
</SCRIPT>
</HEAD>
<BODY>
<H2>Common password transform for luo@www.e-retailer.com</H2>
Note:
Before enter your common password, please check the URL shown in your Web browser.
Unless it is "https://www.worldnet.att.net/OnePassword", do not proceed!
<HR>
<FORM ACTION="https://www.e-retailer.com/login" METHOD="post">
<TABLE BORDER="5" CELLSPACING="5">
<TR><TD>User identity: </TD>
<TD><INPUT TYPE="text" SIZE="10" READONLY NAME="UserID"
VALUE="luo"></TD></TR>
<TR><TD>Server name: </TD>
```

-continued

```
<TD><INPUT TYPE="text" SIZE="40" READONLY NAME="ServerName"
VALUE="www.e-retailer.com"></TD></TR>
<TR><TD>Random number: </TD>
<TD><INPUT TYPE="text" SIZE="40" READONLY NAME="RandomNumber"
VALUE="0123456789"></TD></TR>
<TR><TD>Enter common password: </TD>
<TD><INPUT TYPE="password" SIZE="40" NAME="CommonPassword"
VALUE=""></TD></TR>
<TR><TD>Get designated password: </TD>
<TD><INPUT TYPE="text" SIZE="40" NAME="DesignatedPassword" VALUE=""
onFocus="
if(CommonPassword.value !="")
{
rn = des(UserID.value, CommonPassword.value, ServerName.value);
DesignatedPassword.value = convert(UserID.value, CommonPassword.value,
                  ServerName.value, rn);
CommonPassword.value="";
DesignatedPassword.select();
}
"></TD></TR>
<TR><TD ALIGN="center" COLSPAN=2>
<TABLE CELLSPACING=10 WIDTH="75%">
<TR><TD ALIGN="left"><INPUT TYPE="button" NAME="SubmitButton"
VALUE="Submit" onClick="
if(CommonPassword.value !="")
{
rn = des(UserID.value, CommonPassword.value, ServerName.value);
DesignatedPassword.value = convert(UserID.value, CommonPassword.value,
                  ServerName.value, rn);
CommonPassword.value="";
}
"></TD>
<TD ALIGN="right"><INPUT TYPE="reset" NAME="ResetButton"
VALUE="Reset"></TD></TR>
</TABLE>
</TD></TR>
</TABLE>
</FORM>
</BODY>
</HTML>
```

As it can be seen in the above code, after the user enters his common password, the exemplary JavaScript code will do the following jobs in order, (1) decrypting the encrypted random number; (2) calculating the designated password; and (3) deleting the common password, before the designated password is submitted to the password verification program located by "https://www.e-retailer.com/login".

With reference primarily to FIG. 5, a regular authentication process of the common password method on the Web consists of the following steps. A user makes an HTTP request to an e-commerce server or Web server to access his account on this server, step 500. The e-commerce server returns an "enter user id" page to the user, which contains the standard name of the e-commerce server, the URL of the password verification program for account access, and the URL of a default password transform server, step 510. The user fills in his/her user ID and, optionally, a URL of a new password transform server trusted by the user, step 520. The user clicks the "submit" button in the "enter user ID" page, which triggers that all inputs and preloaded parameters are submitted to the specified password transform server as an HTTP request, step 530. The password transform server extracts the user id and the URL of the password verification program from the submission, and sends an HTTP request to the password verification program with the user id as the input, step 540. The password verification program at the e-commerce or account service provider server returns a small page to the password transform server, which contains an encrypted random number, step 550. The password transform server customizes an "enter common password" page and returns it to the user as a response to the user's HTTP request, which contains the user ID, the standard name of the e-commerce server, the encrypted random number, and the URL of the password verification program, step 560. The user checks if the URL of this "enter common password" page is delivered from the default (or specified) password transform server. If yes, the user enters the common password and obtains the designated password, step 570. The user then clicks on the "submit" button, which triggers that the user id and the designated password are submitted to the password verification program at the e-commerce server, step 580. In a variation of the above embodiment, if the user elects to update the designated password without changing the common password, the user will need to click on a "submit and update password" button.

Using the common password method, an account service provider, such an e-commerce site provider or "e-tailer" can benefit in addition to the benefit from providing its users convenience and security assurance for their passwords. In one exemplary embodiment, if an account service provider chooses to accept an ordinary original password from a user who uses the same password in a number of other sites, and the password is then stolen from the account service provider's server, the account service provider may be liable for the user's consequent losses occurring at other sites which have been compromised. On the contrary, if the account service provider only accepts transformed passwords in accordance with the teachings herein, and if a user's transformed password for this specific account service provider is stolen, this transformed password cannot be used to access the user's other accounts and thus the account service provider can escape liability since the stolen transformed password would not be valid on the other user's sites.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

We claim:

1. A computer implemented method for providing access to multiple Web accounts via a universal password which is valid for the multiple Web accounts, the method comprising:

provided a designated password for each of the multiple Web accounts, the designated password being calculated for each of the multiple Web accounts based on a hash function which incorporates the universal password, user ID, an account server name and a random number stored at the server as inputs to the hash function;

receiving the universal password for access to at least one of the multiple Web accounts;

determining if the universal password is valid based on the associated designated password for the at least one of the multiple Web accounts;

providing access to the at least one of the multiple Web accounts provided the universal password is valid; and providing a new designated password for the at least one of the multiple Web accounts if requested, by generating a new random number and calculating the new designated password based on a hash function that incorporates the universal password, the user ID, the account server name, and the new random number.

* * * * *